(12) United States Patent
Liu et al.

(10) Patent No.: US 8,105,439 B2
(45) Date of Patent: Jan. 31, 2012

(54) WATER QUALITY CONTROL METHOD FOR AN EVAPORATIVE COOLING WATER CHILLER AND A SYSTEM THEREOF

(75) Inventors: Fu-Chin Liu, Dongshih Township, Taichung County (TW); Ming-Tsun Ke, Taipei (TW); Jien-Chuan Chu, Hsinchu (TW)

(73) Assignee: Pin-Tsan Su, Taipei (TW)

( * ) Notice: Subject to any disclaimer, the term of this patent is extended or adjusted under 35 U.S.C. 154(b) by 316 days.

(21) Appl. No.: 12/155,143

(22) Filed: May 30, 2008

(65) Prior Publication Data
US 2009/0065188 A1 Mar. 12, 2009

(30) Foreign Application Priority Data
Sep. 10, 2007 (TW) .............................. 96133715 A

(51) Int. Cl.
*B08B 7/00* (2006.01)
*B08B 7/04* (2006.01)
(52) U.S. Cl. ........... 134/17; 134/18; 134/56 R; 134/105; 134/30
(58) Field of Classification Search ................ 134/22.1, 134/22.18, 26, 30, 105, 166 R, 168 R, 56 R, 134/57 R, 16, 17, 18, 19, 104.2, 58 R, 109
See application file for complete search history.

(56) References Cited

U.S. PATENT DOCUMENTS

| 4,193,269 | A | * | 3/1980 | Barry | 62/171 |
| 4,213,306 | A | * | 7/1980 | Peabody et al. | 62/85 |
| 5,207,074 | A | * | 5/1993 | Cox et al. | 62/285 |
| 5,273,687 | A | * | 12/1993 | Osborne | 261/29 |
| 5,533,259 | A | * | 7/1996 | Hughes et al. | 29/890.043 |
| 5,666,910 | A | * | 9/1997 | George et al. | 122/40 |
| 6,442,951 | B1 | * | 9/2002 | Maeda et al. | 62/94 |

FOREIGN PATENT DOCUMENTS

DE 10001469 C1 * 10/2001
WO WO 0017575 A1 * 3/2000

* cited by examiner

*Primary Examiner* — Alexander Markoff

(57) ABSTRACT

A water quality control method for an evaporative cooling water chiller uses a water pump to transport cooling water from a water tank to a water-spraying element via a water pipe. The cooling water is sprayed onto fins and a refrigerant pipe of a first heat exchanger, flows along the fins and is collected in the water tank. Thereby, the cooling water reduces the temperature of the heat exchanger. The water pump is set to operate for a first period and to stop for a second period so that the temperature of the fins and the refrigerant pipe increases. Thereby, the limescales attached to the heat exchanger are detached and drop into the water tank. Subsequently the water pump is turned on again. The cooling water in the water tank flushes out the accumulated particles on the bottom of the water tank, and clean cooling water is added.

9 Claims, 5 Drawing Sheets

```
┌─────────────────────────────────────────────┐
│  transporting and spraying the cooling water │
│    in the water tank to the fins and the    │
│  refrigerant pipe of the first heat exchanger│
└─────────────────────────────────────────────┘
                      │
                      ▼
┌─────────────────────────────────────────────┐
│    setting the water pump to operate for     │
│     a first period and stop operating for    │
│     a second period so that the water pipe   │
│      stops spraying the water to the first   │
│   heat exchanger, therefore the temperature  │
│       of the fins and the refrigerant pipe   │
│      increases and the limescales attached to│
│       the first heat exchanger are detached  │
└─────────────────────────────────────────────┘
                      │
                      ▼
┌─────────────────────────────────────────────┐
│     turning on the water pump to use the     │
│         cooling water in the water tank to   │
│     flush the accumulated particles on the   │
│      bottom of the water tank so that the    │
│   accumulated particles and limescales are   │
│  exhausted, and clean cooling water is added │
└─────────────────────────────────────────────┘
```

FIG. 5

WATER QUALITY CONTROL METHOD FOR AN EVAPORATIVE COOLING WATER CHILLER AND A SYSTEM THEREOF

BACKGROUND OF THE INVENTION

1. Field of the Invention

The present invention relates to a water quality control method for an evaporative cooling water chiller and a system thereof. In particular, this invention relates to a water quality control method for an evaporative cooling water chiller and a system thereof that is applied to HVAC systems. It can remove the limescales attached to the condenser so that the usage life of the heat exchanger increases and the heat transfer efficiency also increases. The required electrical power is also reduced and the environmental protection is achieved.

2. Description of the Related Art

As the technology has been developed, people wish to have a comfortable living environment. People usually install an air-conditioner in their house. The household air-conditioner usually employs direct-expansion equipment. Similarly, commercial buildings and factories also use air-conditioners to maintain indoor temperature. However, in order to reduce costs and avoid technology difficulties, chilled-water is used to replace the refrigerant for air-conditioners in commercial buildings or factories. This means that chilled-water output from the water chiller is provided to the air-conditioner.

However, because the cooling water has impurities, limescale is formed on the fins and the refrigerant pipe when the cooling water flows through the fins and the coil of the condenser. Thereby, the fins and the refrigerant pipe are corroded, the usage life of the heat exchanger shortens and the heat transfer efficiency is reduced. The required power for the water chiller increases and the environment suffers due to the excessive thermal energy consumption.

SUMMARY OF THE INVENTION

One particular aspect of the present invention is to provide a water quality control method for an evaporative cooling water chiller and a system thereof. It can control the quality of the cooling water in the evaporative cooling water chiller. The usage life of the condenser increases and the heat transfer efficiency also increases. The required power for the evaporative cooling water chiller is reduced so that power is saved, thus benefiting the environment.

The present invention discloses a water quality control method for an evaporative cooling water chiller. The steps include transporting the cooling water in a water tank to a water-spraying element via a water pipe by means of a water pump. The cooling water is sprayed on the fins and the refrigerant pipe of the first heat exchanger, flows downwards along the fins and is collected in the water tank. Thereby, the cooling water repeatedly performs a water-cooling process to reduce the temperature of the first heat exchanger. After the water pump operates for a first period, the water pump stops for a second period so that the water pipe does not spray the water to the first heat exchanger and the temperature of the fins and the refrigerant pipe increases. Thereby, the limescales attached to the first heat exchanger are detached due to thermal stress, and the detached limescales drop into the water tank. After the water pump stops for the second period, the water pump is turned on. The cooling water in the water tank flushes the accumulated impurities on the bottom of the water tank and the cooling water and the limescales are exhausted, and the clean cooling water is added. The above steps are repeated.

The water quality control system for an evaporative cooling water chiller includes a first heat exchanger having fin array and a refrigerant pipe passing through the fins, an air-cooling device installed above the first heat exchanger, a water-cooling device having a water pipe, a water tank, and a water pump, and a time control device electrically connected with the water pump. The water pipe is connected to a water-spraying element. The water-spraying element is located above the first heat exchanger. The water tank is located below the first heat exchanger. The water pump and the water pipe are connected to the water tank. The time control device sets the water pump to operate for a first period and stop for a second period. Therefore, the temperature of the fins and the refrigerant pipe increases periodically and the limescales attached to the first heat exchanger are detached due to thermal stress.

The present invention has the following characteristics. The present invention uses the time control device to set the water pump to operate for a first period and stop for a second period. Therefore, the water-cooling device stops spraying the water to the first heat exchanger. The temperature of the fins and the refrigerant pipe of the first heat exchanger increases and the limescales attached to the first heat exchanger are detached and exhausted. Therefore, the first heat exchanger does not accumulate limescales, and the water quality is increased. The usage life of the first heat exchanger increases and the heat transfer efficiency of the first heat exchanger is enhanced. The required power for the water chiller is reduced thus benefiting the environment.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows:

FIG. 5 is a flow chart of the water quality control method for an evaporative cooling water chiller of the present invention.

DETAILED DESCRIPTION OF THE PREFERRED EMBODIMENTS

Figure 1:
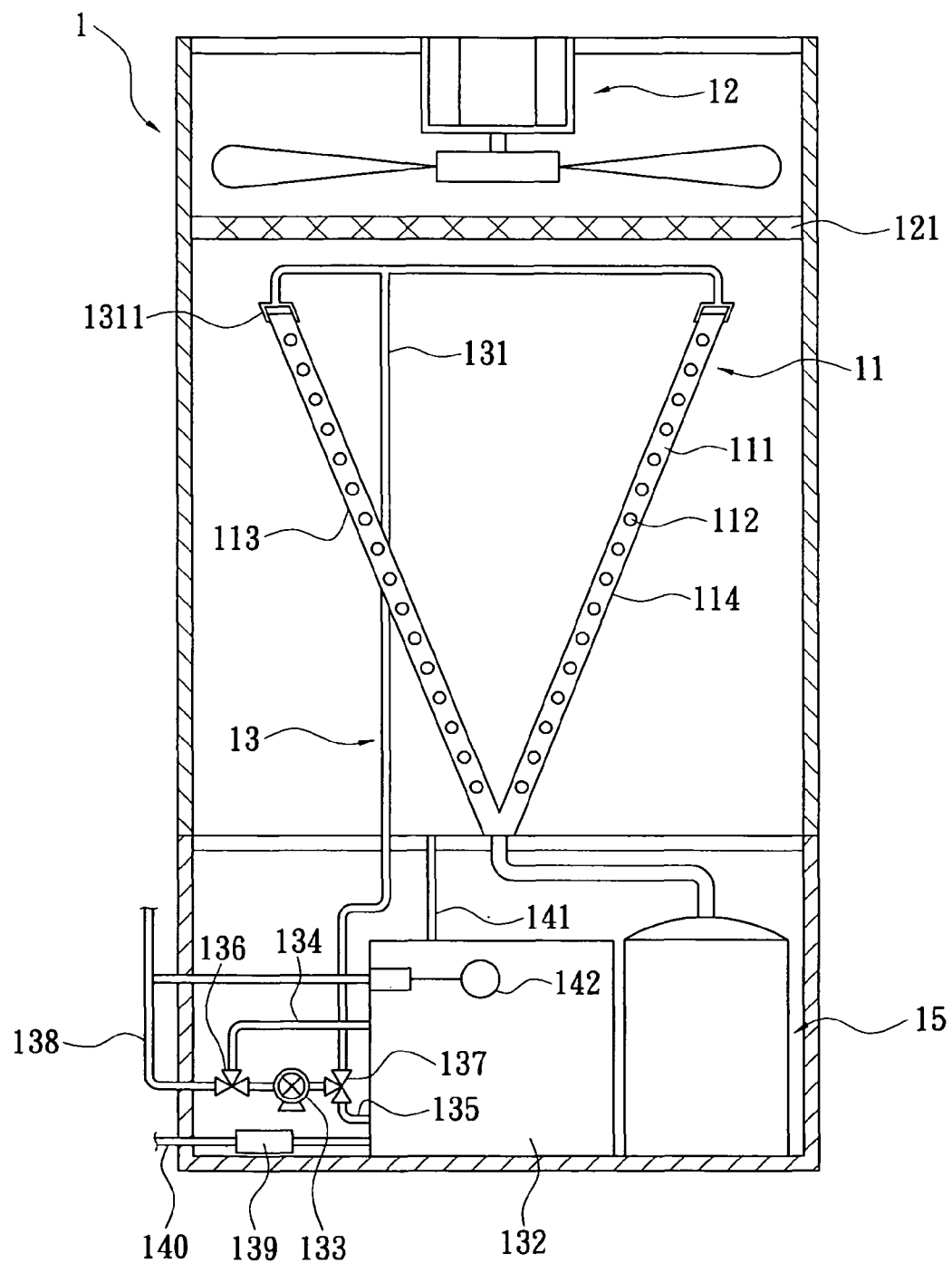
FIG. 1 is a front view of the water quality control system for an evaporative cooling water chiller of the present invention.
Figure 2:
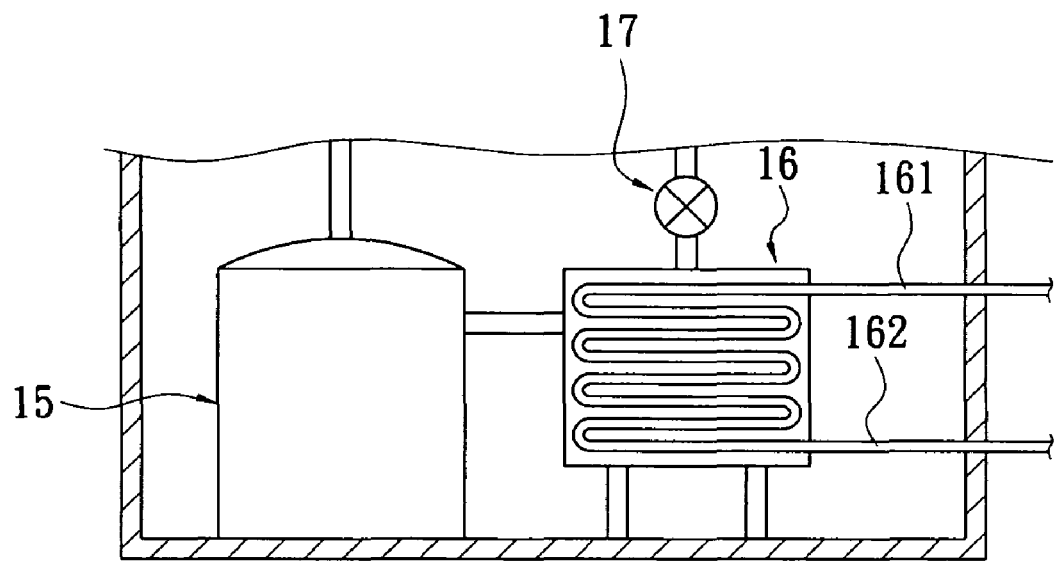
FIG. 2 is a side view of part of the water quality control system for an evaporative cooling water chiller of the present invention.
Figure 3:
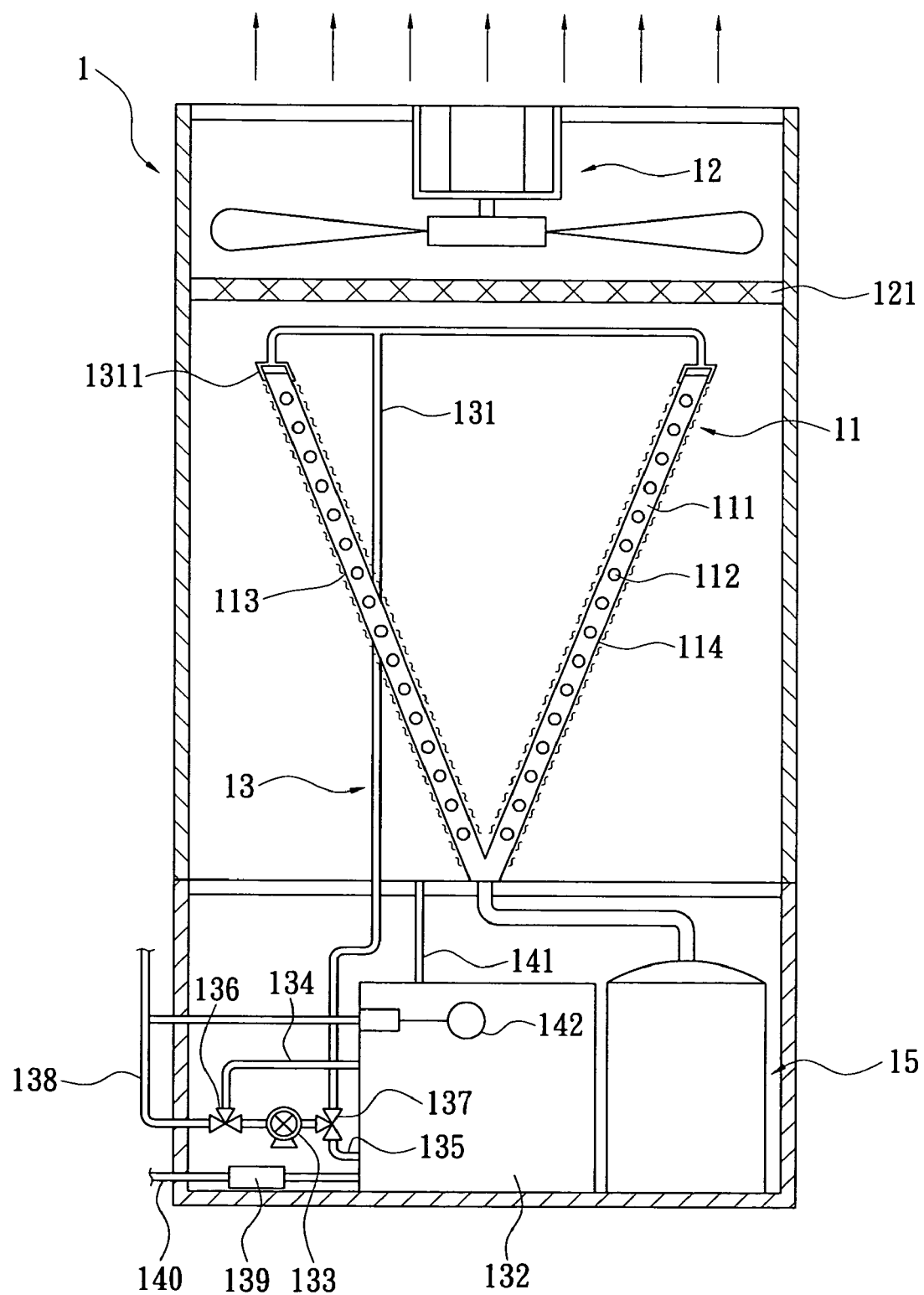
FIG. 3 is a schematic diagram of the usage status of the water quality control system for an evaporative cooling water chiller of the present invention.
Figure 4:
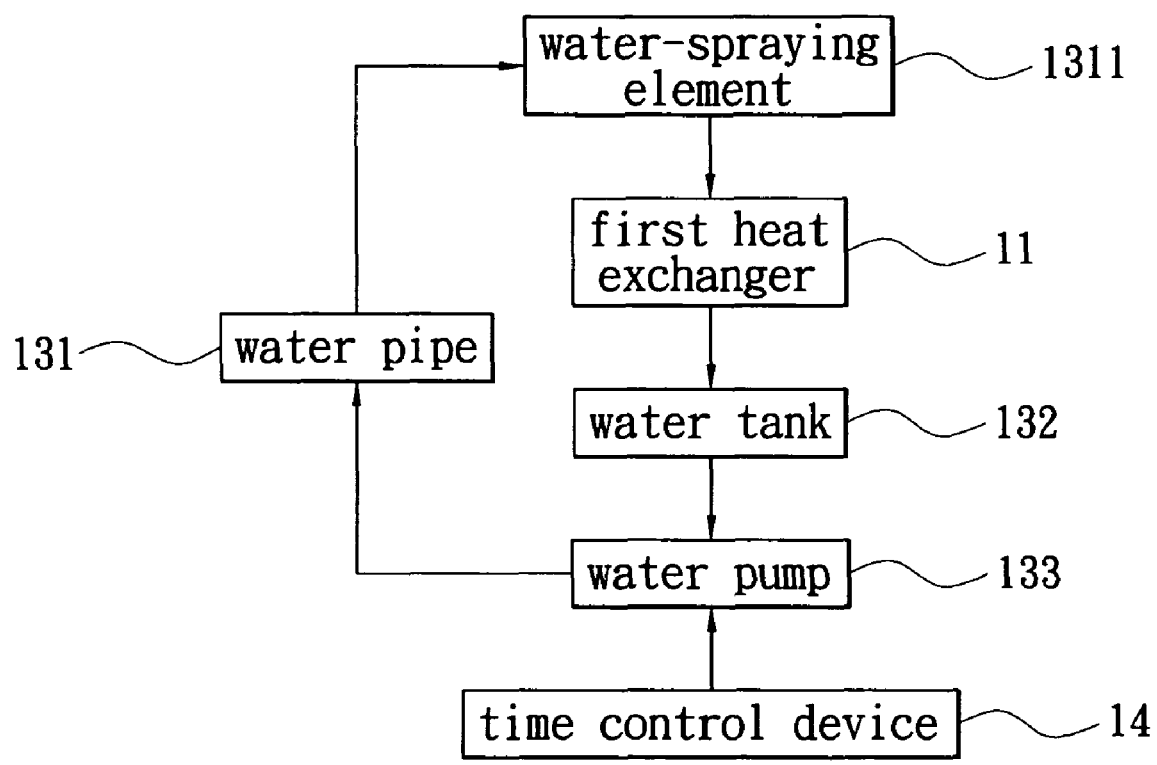
FIG. 4 is a block diagram of the water quality control method for an evaporative cooling water chiller of the present invention.

Reference is made to FIGS. 1~3, which show the water quality control system for an evaporative cooling water chiller of the present invention. The water quality control system 1 includes a first heat exchanger 11, an air-cooling device 12, a water-cooling device 13, and a time control device 14 (as shown in FIG. 4).

The first heat exchanger 11 includes a plurality of fins 111 and a refrigerant pipe 112 passing through the fins 111. The fins 111 are made of metal with a high heat-conductivity, such as aluminum or copper. The fins 111 are disposed in a V-shape, a U-shape, an L-shape, a vertical parallel shape, or other shapes. In this embodiment, the fins 111 are disposed in a V-shape. This means the fins 111 are disposed in a first side portion 113 and a second side portion 114. The lower ends of the first side portion 113 and the second side portion 114 are connected together. The first side portion 113 and the second side portion 114 are slanted outwards from the bottom to top so that the first heat exchanger 11 is a V-shape structure with an opening at a top side thereof.

The refrigerant pipe 112 is filled with the refrigerant. The refrigerant pipe 112 is connected to a compressor 15, a second heat exchanger 16, and an expansion device 17. The compressor 15, the second heat exchanger 16 and the expansion device 17 are located below the first heat exchanger 11. The heat of the refrigerant in the refrigerant pipe 112 is absorbed by the second heat exchanger 16 to form a gaseous refrigerant, and the gaseous refrigerant is driven by the compressor 15 and enters the first heat exchanger 11. The heat of the gaseous refrigerant is released and its temperature decreases to form a liquid refrigerant.

The second heat exchanger 16 has a water inlet 161 and a water outlet 162. The water inlet is used for inputting higher temperature water into the air-conditioner. After the heat is rejected by the second heat exchanger 16, the water outlet 162 outputs the chilled-water to the air-conditioner.

The air-cooling device 12 is installed above the first heat exchanger 11. In this embodiment, the air-cooling device 12 is an up-drawing fan for drawing the hot air around the first heat exchanger 11 upwards to cool the fins 111 and the refrigerant pipe 112 of the first heat exchanger 11 and reduce the temperature of the fins 111 and the refrigerant pipe 112. There is a water-blocking eliminator 121 below the air-cooling device 12. The water-blocking eliminator 121 is located between the air-cooling device 12 and the water-cooling device 13 for blocking the water.

The water-cooling device 13 includes a water pipe 131, a water tank 132, and a water pump 133. The upper end of the water pipe 131 is connected a water-spraying element 1311. The water-spraying portion 1311 is located above the first heat exchanger 11. The water tank 132 is located below the first heat exchanger 11 for collecting the cooling water. There is a water-restoring input pipe 141 below the first heat exchanger 11 so that the cooling water can flow back to the water tank 132.

The water pump 133 is located outside of the water tank 132. The water pump 133 and the water pipe 131 are connected with the water tank 132. The first pipe 134 and the second pipe 135 are connected between the water pump 133 and the water tank 132. The first pipe 134 and the second pipe 135 are respectively installed with a first three-way control valve 136 and a second three-way control valve 137. The second three-way control valve 137 is connected to the lower end of the water pipe 131. The water pump 133 is connected to a clean water source via the first three-way control valve 136 and a third pipe 138.

The bottom of the interior of the water tank 132 is connected to a water-exhaust pipe 140 with a control valve 139 for control the water flow. When the control valve 139 is opened, the cooling water, the limescales, and the accumulated particles are exhausted. In the interior of the water tank 132, there is a water level detection floating-ball 142 for detecting the water level and automatically controlling the water input.

The water pump 133 uses the first three-way control valve 136 and the second three-way control valve 137 to control the operations, including supplying water, washing, and adding clean water, etc. When the water-supplying operation is performed, the cooling water in the water tank 132 is pumped to the water pipe 131 via the first pipe 134, the first three-way control valve 136, the water pump 133 and the second three-way control valve 137. When the washing operation is performed, the cooling water in the water tank 132 is pumped to the water tank via the first pipe 134, the first three-way control valve 136, the water pump 133, the second three-way control valve 137 and the second pipe 125. Therefore, the particles accumulated at the bottom of the water tank 132 are washed and exhausted via the water-exhaust pipe 140. When the clean water adding operation is performed, the clean water is pumped to the water tank 132 via the third pipe 138, the first three-way control valve 136, the water pump 133, the second three-way control valve 137 and the second pipe 135.

When the water pipe 131 supplies the cooling water, the cooling water is sprayed to the fins 111 and the refrigerant pipe 112 by the water-spraying element 1311. The cooling water flows downwards along the fins 111 so that the cooling water fully contacts the fins 111 to lower the temperature. By using the air-cooling device 12 and the water-cooling device 13, the first heat exchanger 11 is cooled. After the cooling water flows downwards along the fins 111, the cooling water is collected in the water tank 132, and is pumped to the water pipe 131 via the first pipe 134, the first three-way control valve 136, the water pump 133 and the second three-way control valve 137. Thereby, the cooling water repeatedly cools the first heat exchanger 11.

The time control device 14 is electrically connected to water pump 133. The time control device 14 sets the water pump 133 to operate for a first period and stop for a second period. Therefore, the water-cooling device 13 stops spraying the Water to the first heat exchanger 11. The temperature of the fins 111 and the refrigerant pipe 112 of the first heat exchanger 11 increases and the limescales attached to the first heat exchanger 11 are detached.

Reference is made to FIGS. 1~5. The water quality control method for an evaporative cooling water chiller includes the steps:

1. Transporting the cooling water into the water tank 132 to the water-spraying element 1311 via the water pipe 131 by means of a water pump 133 of the water-cooling device 13. The cooling water is sprayed onto the fins 111 and the refrigerant pipe 112 of the first heat exchanger 11, flows downwards along the fins 111 and is collected in the water tank 132. Thereby, the cooling water repeatedly performs a water-cooling process to the first heat exchanger 11 and reduces its temperature. By using the air-cooling device 12 installed above the first heat exchanger 11, the hot air around the first heat exchanger 11 is drawn upwards to cooling the fins 111 and the refrigerant pipe 112 of the first heat exchanger 11.

2. Uses the time control device 14 to set the water pump 133 to operate for a first period (about 0.5 to 4 fours) and stop for a second period (about 3 to 20 minutes). Therefore, the water pipe 131 of the water-cooling device 13 stops spraying the water to the first heat exchanger 11. The temperature of the fins 111 and the refrigerant pipe 112 of the first heat exchanger 11 increases and the limescales attached to the fins 111 and the refrigerant pipe 112 are detached because the thermal expansion coefficients of the fins 111 and the refrigerant pipe 112 and the limescales are different. The detached limescales drop into the water tank 132.

3. After the water pump 133 stops for the second period, the control valve 139 is used to open the water-exhaust pipe 140 and the water pump 133 is turned on. The cooling water in the water tank 132 flushes the accumulated impurities on the bottom of the water tank 132 so that the accumulated particles and the limescales are exhausted. Next, the water level detection floating-ball 142, the third pipe 138 and the water pump 133 are used to control the water, and the clean cooling water is added. The above steps 1-3 are repeated.

The present invention uses the time control device 14 to set the water pump 133 to operate for a first period and stop for a second period. Therefore, the water pipe 131 of the water-cooling device 13 stops spraying the water to the first heat exchanger 11. The temperature of the fins 111 and the refrigerant pipe 112 of the first heat exchanger 11 increases and the limescales attached to the fins 111 and the refrigerant pipe 112 are detached due to thermal stress and exhausted. The water is exhausted constantly so that the accumulated particles decreases and the limescales are not attached to the first heat exchanger 11. The water quality is controlled, the usage life of the first heat exchanger increases, and the heat transfer efficiency of the first heat exchanger 11 is enhanced. Electric power is saved thus benefiting the environment.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A method for self-cleansing limescale accumulated on a first heat exchanger in evaporative cooling equipment, wherein the first heat exchanger includes a plurality of fins and a refrigerant pipe passing through the fins, comprising steps performed during evaporative cooling of:
   transporting cooling water in a water tank upwardly to a water-spraying element via a water pipe by means of a water pump;
   spraying the cooling water on the fins and the refrigerant pipe of the first heat exchanger, and the cooling water flowed downward along the fins being collected in the water tank;
   setting the water pump to operate for a first period, and then stopping the water pump;
   causing temperature of the fins and the refrigerant pipe to periodically rise by stopping the water pump from spraying water to the first heat exchanger for a second period, until the first heat exchanger is expanded due to thermal expansion and the limescale attached to the first heat exchanger are detached;
   turning on the water pump to flush the limescale and accumulated particles in the water tank by the cooling water in the water tank, and exhausting the cooling water with the accumulated particles and the limescale; and
   adding clean cooling water to the water tank.

2. The method for self-cleansing limescale accumulated on a first heat exchanger in evaporative cooling equipment as claimed in claim 1, further comprising the step of providing an air-cooling device located above the first heat exchanger to perform an air-cooling process to the first heat exchanger.

3. The method for self-cleansing limescale accumulated on a first heat exchanger in evaporative cooling equipment as claimed in claim 1, further comprising the step of providing a time control device to control the water pump for operating or stopping.

4. The method for self-cleansing limescale accumulated on a first heat exchanger in evaporative cooling equipment as claimed in claim 1, further comprising the step of setting the first period between 0.5 and 4 hours, and the second period between 3 and 20 minutes.

5. An evaporative cooling equipment with a function of self-cleansing limescale accumulated therein, comprising:
   a first heat exchanger having a plurality of fins and a refrigerant pipe passing through the fins, wherein the fins of the first heat exchanger are divided into a first side portion and a second side portion, wherein the first side portion and the second side portion have lower ends connected together and are slanted outwards from bottom to top, whereby the first heat exchanger is V-shaped and formed with an opening at a top side thereof;
   an air-cooling device installed above the first heat exchanger;
   a water-cooling device having a water pipe, a water tank, and a water pump;
   a water-spraying element located above the first heat exchanger and connecting to the water pipe, wherein the water tank is located below the first heat exchanger, and the water pump and the water pipe are connected with the water tank; and
   a time control device programmed to control the water pump to periodically raise temperature of the fins and the refrigerant pipe during evaporative cooling by stopping the water pump for a second period after operating for a first period until an expansion of the first heat exchanger is caused due to thermal expansion and the limescale attached to the first heat exchanger are detached.

6. The evaporative cooling equipment with a function of self-cleansing limescale accumulated therein as claimed in claim 5, further comprising an air-cooling device located above the first heat exchanger.

7. The evaporative cooling equipment with a function of self-cleansing limescale accumulated therein as claimed in claim 5, further comprising a water-exhaust pipe with a control valve connected to the water tank to control water-exhausting.

8. The evaporative cooling equipment with a function of self-cleansing limescale accumulated therein as claimed in claim 5, wherein the water tank has a floating-ball for detecting a level of water therein and controlling water-supply.

9. The evaporative cooling equipment with a function of self-cleansing limescale accumulated therein as claimed in claim 5, further comprising a first pipe and a second pipe connected between the water pump and the water tank, wherein the water pump is located outside of the water tank, the first pipe and the second pipe are respectively installed with a first three-way control valve and a second three-way control valve, the second three-way control valve being connected to a lower end of the water pipe, and the water pump being connected to a clean water source via the first three-way control valve and a third pipe.

* * * * *